(No Model.) 5 Sheets—Sheet 1.
A. P. RIGGS.
AUXILIARY REGULATING VALVE MECHANISM FOR AIR BRAKES.
No. 457,670. Patented Aug. 11, 1891.
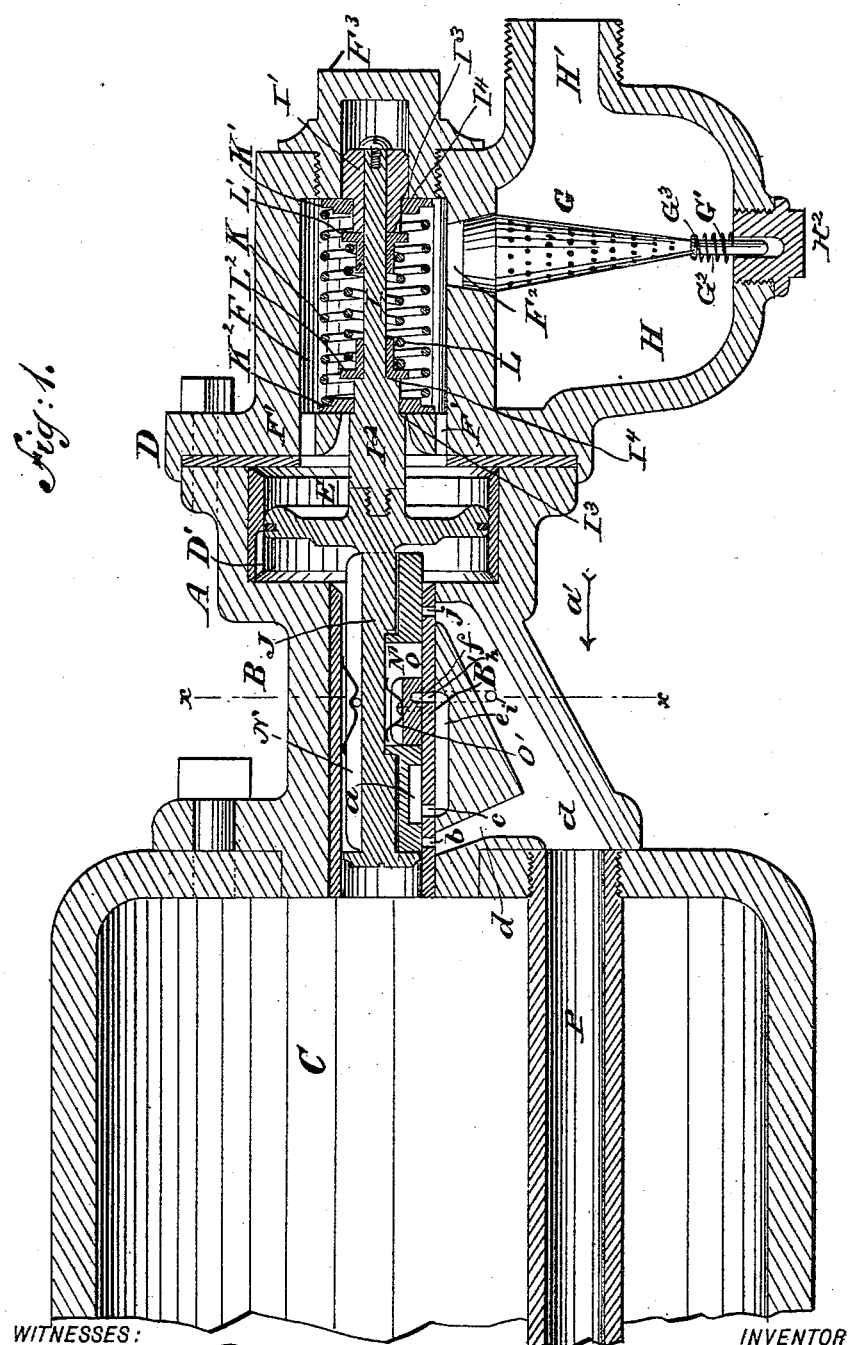
WITNESSES:
Chas. Nida
C. Sedgwick
INVENTOR:
A. P. Riggs
BY Munn & Co.
ATTORNEYS (No Model.)  5 Sheets—Sheet 2.
A. P. RIGGS.
AUXILIARY REGULATING VALVE MECHANISM FOR AIR BRAKES.
No. 457,670.  Patented Aug. 11, 1891.
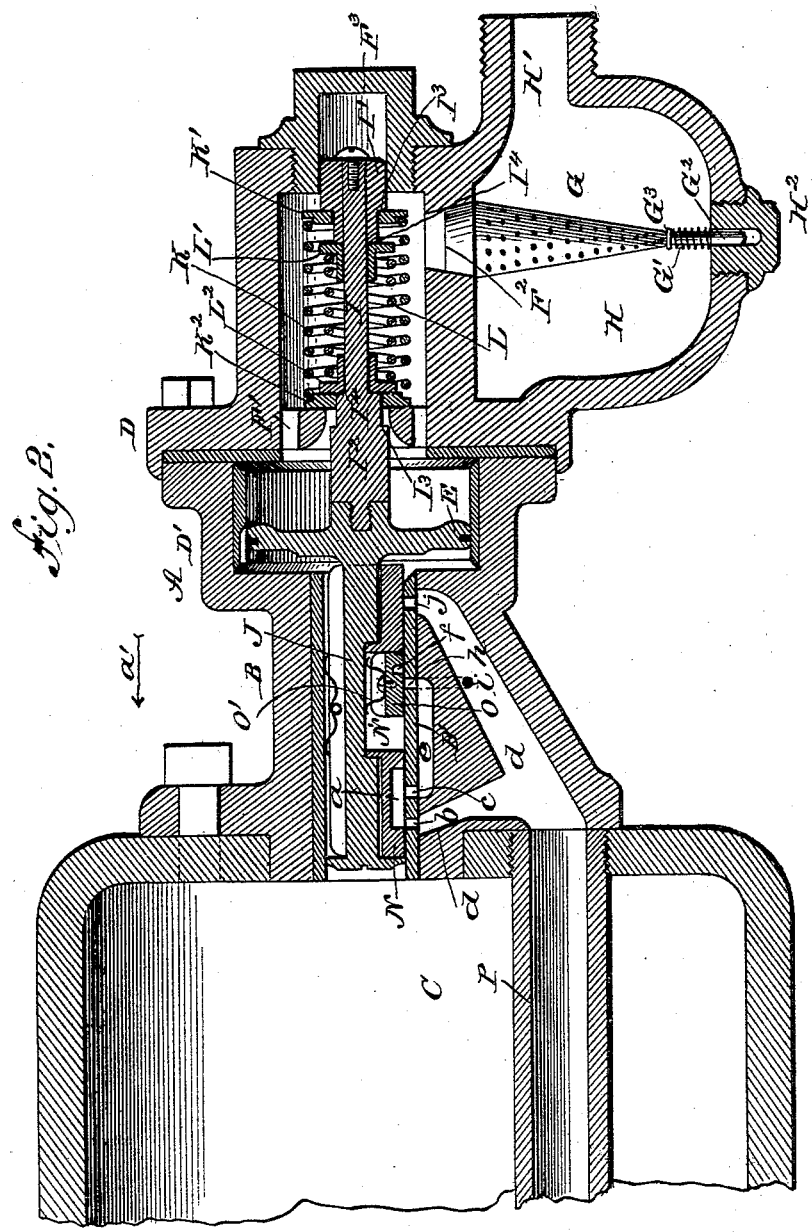
WITNESSES:
Fred G. Dieterich
Geo. H. Evans
INVENTOR:
A. P. Riggs
BY Munn & Co
ATTORNEYS (No Model.) 5 Sheets—Sheet 3.
A. P. RIGGS.
AUXILIARY REGULATING VALVE MECHANISM FOR AIR BRAKES.
No. 457,670. Patented Aug. 11, 1891.
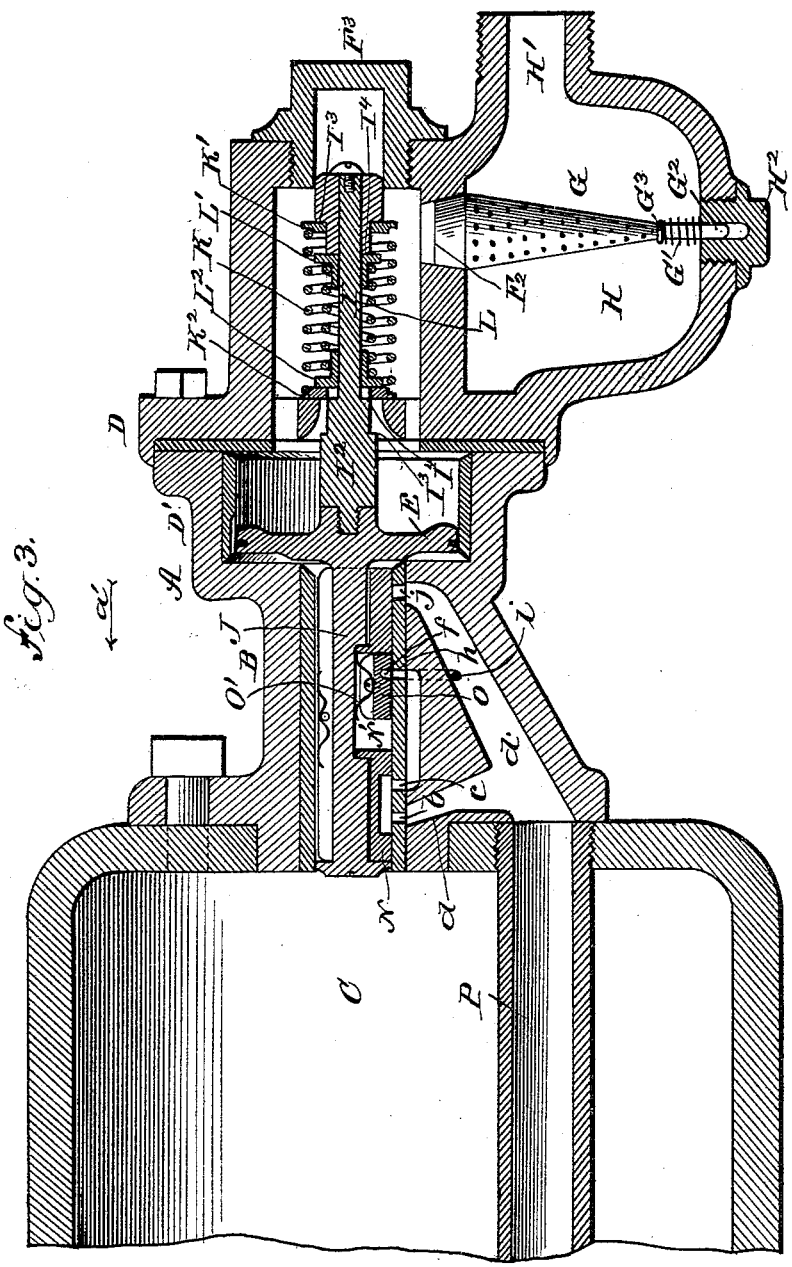

(No Model.) 5 Sheets—Sheet 4.
A. P. RIGGS.
AUXILIARY REGULATING VALVE MECHANISM FOR AIR BRAKES.
No. 457,670. Patented Aug. 11, 1891.
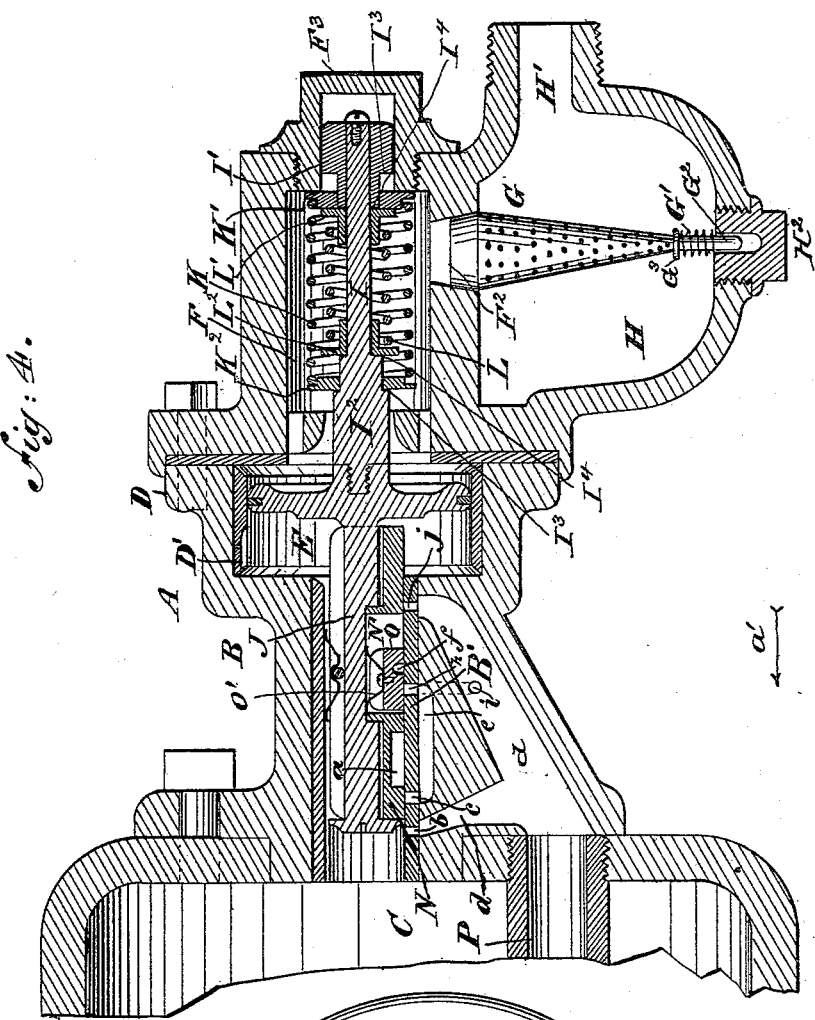
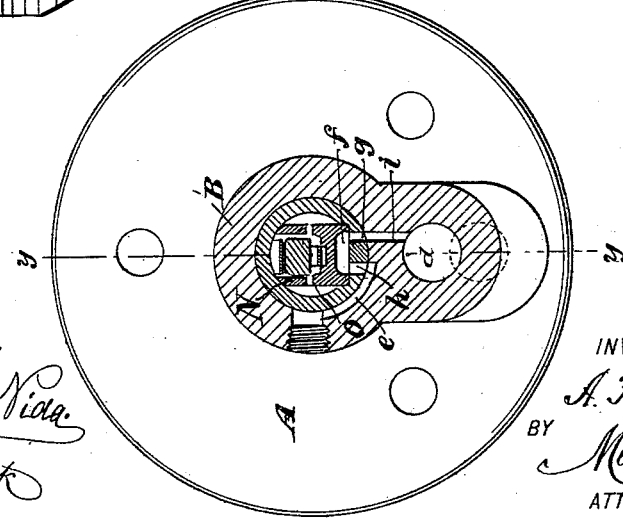
WITNESSES:
Chas. Nida.
C. Sedgwick.
INVENTOR:
A. P. Riggs
BY Munn & Co.
ATTORNEYS

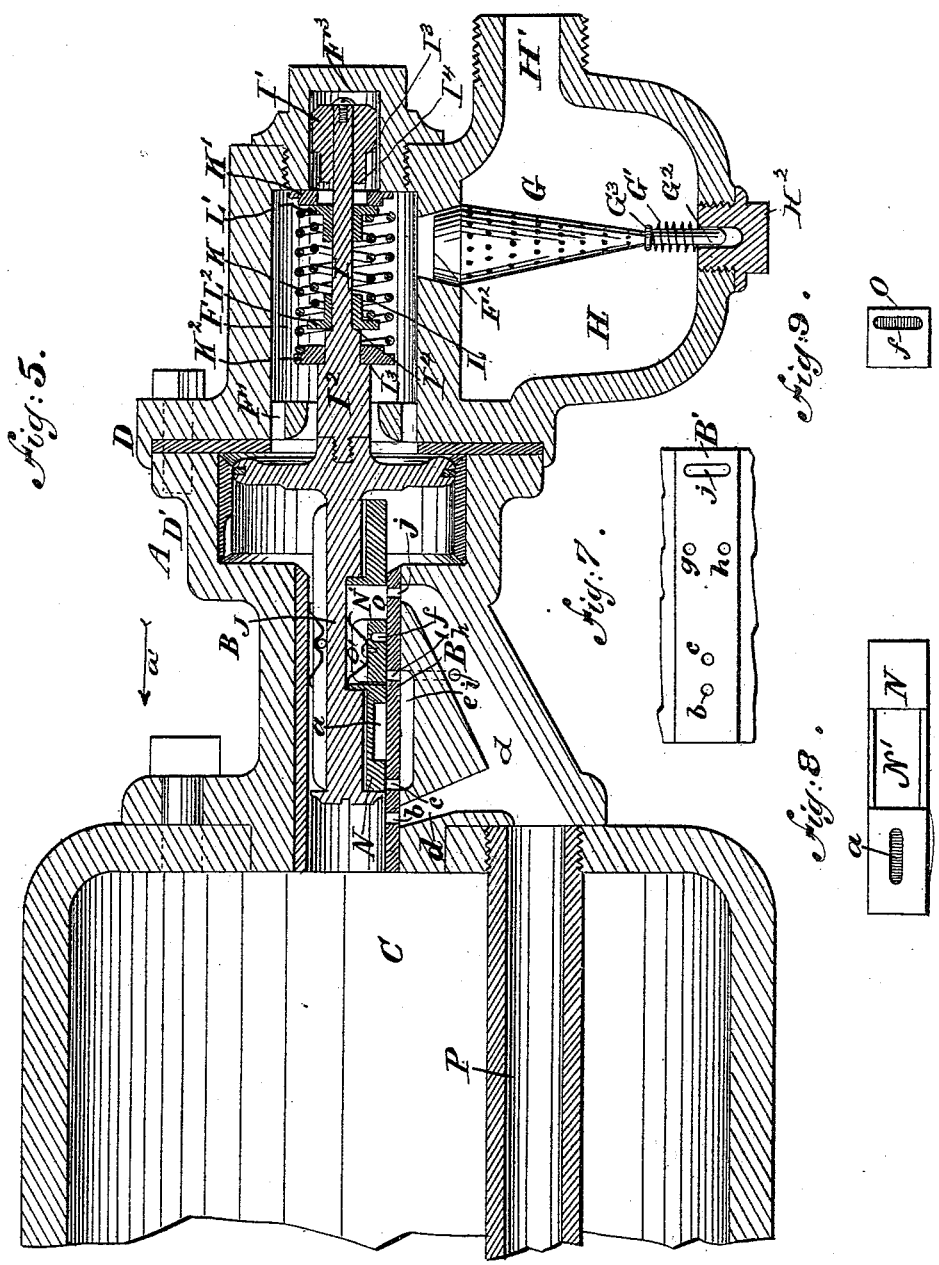

UNITED STATES PATENT OFFICE.

ALFRED P. RIGGS, OF COLORADO CITY, COLORADO.

AUXILIARY REGULATING VALVE MECHANISM FOR AIR-BRAKES.

SPECIFICATION forming part of Letters Patent No. 457,670, dated August 11, 1891.

Application filed October 4, 1890. Serial No. 367,043. (No model.)

*To all whom it may concern:*

Be it known that I, ALFRED P. RIGGS, of Colorado City, in the county of El Paso and State of Colorado, have invented a new and Improved Triple Valve for Air-Brakes, of which the following is a full, clear, and exact description.

The invention relates to a triple valve of fluid-pressure brakes; and its object is to provide certain new and useful improvements in said valve by which after the brakes are set the pressure in the brake-cylinder may be reduced to any desired amount, and the auxiliary reservoir receive at the same time an amount equal to that released from the brake-cylinder; also to provide a novel spring mechanism for returning the piston to its normal position, and also to provide the drip-cup with a readily-removable strainer.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all figures.

Figure 1 is a longitudinal vertical central section of my improved triple valve, the parts being in their normal position. Fig. 2 is a similar view with the parts in position for a partial or graduating release. Fig. 3 is a similar view with the parts in position for a quick release. Fig. 4 is a similar view, the parts being in the position which they occupy when a graduating or partial application of the brakes takes place. Fig. 5 is a similar view, the parts being in position for an emergency application of the brakes. Fig. 6 is a transverse vertical section on line $x\,x$ of Fig. 1. Fig. 7 is a plan of the slide-valve seat. Fig. 8 is a plan of the lower side of the slide-valve, and Fig. 9 is a similar view of the auxiliary slide-valve.

A is the valve-casing, near one end of which is arranged an air-brake valve-cylinder B open at both ends, one end leading to the auxiliary reservoir C and the other end into the piston-cylinder D, in which is fitted to slide the piston E, and which is also provided with a feeding-groove D'. The piston-cylinder D connects by openings F' with a chamber F, connected by opening $F^2$ with a perforated funnel G, extending into the drip-chamber H, adapted to be connected at H' with the train-pipe. A spring G' holds the funnel G in the opening $F^2$, so that the fluid coming from the train-pipe passes into the drip-chamber H and through the funnel G into the chamber F, to pass through the latter and through the openings F' into the piston-cylinder D, to press against the piston E. Any dust carried by the fluid is prevented from passing to the cylinder D by the funnel G, so that no sand or other impurities are liable to injure the piston or slide-valves. The lower end of the strainer has a stem $G^2$, which enters a socket in the screw-plug $H^2$, and the stem $G^2$ has a collar $G^3$, so that the spring G' bearing against said collar and inner face of the plug will seat the upper end of the strainer in the opening $F^2$, regardless of any nicety of adjustment of said plug. By removing the plug the strainer will drop out or can be readily removed for cleaning or repair.

The piston E is provided on one side with a stem I, extending through the chamber F and carrying a small removable head I' at its outer end, fitted to slide in a tubular screw-plug $F^3$, secured at the outer end of the compartment F; and at the opposite end of the stem is a similar head $I^2$. The two heads are reduced at their adjacent ends to pass through two loose collars K' $K^2$ and to form two shoulders $I^3\,I^4$ on each head. A double-acting graduating-spring K is coiled around the stem I and rests at its ends on loose collars K' and $K^2$ and normally pressing them apart against the shoulders $I^3$ of the heads and against the inner end of plug $F^3$ and inner end of chamber F, respectively. A double-acting emergency graduating-spring L is also coiled around the stem I and rests at its ends on loose collars L' and $L^2$, held directly on the stem I, and presses said collars normally against shoulders $I^4$.

The stem J at the other side of the piston E carries a valve N, fitted to slide over a valve-seat B', (see Fig. 7,) formed on the inside of the valve-cylinder B. The valve N is grooved longitudinally along its upper side to receive stem J, and a transverse intersecting opening N' is formed in the lower face of the valve, in which is fitted to slide a valve O, moved forward and backward over part of the valve-seat B' by the valve N. The valve O is held to the seat B' by spring O' on its upper side, bearing against the lower side of stem J. In the under side of the main valve N is formed a cavity $a$, adapted to connect the ports $b$ and $c$ with each other, as shown in Figs. 1 and 3, said ports being formed in the valve-seat B', and the port $b$ leading into the rear end of a channel $d$, leading to a pipe P, passing through the auxiliary reservoir C and connected with the brake-cylinder. (Not shown.) The port $c$ leads into an exhaust-port $e$, formed in the casing A and leading to the outside, as is plainly shown in Figs. 1 and 6.

In the under side of the auxiliary valve O is formed a transversely-extending cavity $f$, adapted to connect and disconnect the ports $h$ and $g$, formed in the valve-seat B', and of which the port $h$ leads to the exhaust-port $e$, and the other port $g$ connects by a channel $i$ with the channel $d$ leading to a pipe P connected with the brake-cylinder, as previously mentioned. On the valve-seat B' is also formed an emergency port $j$, adapted to be opened and closed by the main valve N and the opening into the said channel $d$.

The operation is as follows: In order to charge a train, (the parts of the triple valve being in the position shown in Fig. 1,) air from the main reservoir is passed through the train-pipe into the drip-chamber H, and from there through the strainer-funnel G into the chamber F, from which the air passes through the openings F' into the cylinder D and exerts its pressure against one side of the piston E, so as to move the same inward against the force of the spring K in the direction of the arrow $a'$, first to the position shown in Fig. 2 and then still farther inward (see Fig. 3, compressing the small spring L) until the air passes through the feed-groove D' and through the cylinder B into the auxiliary reservoir C to charge the same with the desired amount of pressure. When the pressure in the auxiliary reservoir equals that in the train-pipe, then the springs K L force the piston out to the normal position shown in Fig. 1. The valve O will have been moved to the position shown in Figs. 1 and 3 by the movement of the slide-valve. In a graduated application of the brakes the operation is as follows: A slight reduction of pressure in the train-pipe now causes the piston E to move outward against the action of large spring K until it meets with the resistance of the small or emergency spring L. (See Fig. 4.) In thus moving the piston from the position in Fig. 1 to that in Fig. 4 the head $I^2$ moves collar $K^2$ outward, compressing spring K, and the reduced portion of the head I' slides through the collar K' until collar L' abuts against the collar K', when further outward movement of the piston will cease, and thus the spring L will not be compressed, as the collars L' and $L^2$ have not been brought any nearer together.

At the same time the two valves N and O are moved outward, or in the inverse direction of the arrow $a'$, so that the exhaust-ports $h$ and $g$ are disconnected and the port $b$ is opened, thus permitting air to pass from the auxiliary reservoir C through the cylinder B, the port $b$, the channel $d$, and the pipe P to the brake-cylinder to expand therein until the pressure in the auxiliary reservoir C is equal to the pressure in the train-pipe. The spring K then pushes the piston E back to its normal position, Fig. 1, whereby the port $b$ is closed by the valve N, the ports $h$ and $g$ remaining closed, Fig. 4, as the valve O does not now shift with the movement of the valve N, for the reason that the spring K does not move it far enough inward in bringing it to its normal position.

In order to release the brakes partially, the triple-valve mechanism being in position shown in Fig. 1 with the exception that ports $g\ h$ are still disconnected, air is allowed to flow through the train-pipe from the main reservoir to the compartment F and the cylinder D, so as to push the piston E forward again in the direction of the arrow $a'$ until the feed-groove D' is opened and the ports $b$ and $c$ are connected with each other by the cavity $a$ in the main slide-valve N, as shown in Fig. 2. Air can now flow from the brake-cylinder through the pipe P, the channel $d$, the ports $b$ and $c$, and the cavity $a$ to the outer air. This exhaust will continue until the pressure in the train-pipe and the auxiliary reservoir have become equal through feed-groove D' by reason of the relative proportion of the ports and passages, after which the graduating-spring K causes the piston E and the valve N to move back to its normal position, Fig. 1, thus closing the ports $b$ and $c$ while valve O remains as in Figs. 2 and 4, covering the exhaust-ports $g$ and $h$.

For an emergency stop a sudden reduction of air from the train-pipe causes the piston to compress both springs K and L sufficiently to allow of its coming back to its greatest travel, so that the port $b$ and the emergency port $j$ are opened and port $c$ is closed, (see Fig. 5,) thus causing a quick full flow of air to the brake-cylinders from the auxiliary reservoir C, after which the pressure in the train-pipe and auxiliary reservoir equilibrate and the springs K L return the parts except valve O to the position shown in Fig. 1.

In order to produce a quick full release of pressure from the brake-cylinder a full pressure of air is passed through the train-pipe into the triple valve, so as to push the piston E ahead to its greatest travel against the action of both springs K L, whereby both valves N and O are moved in the direction of the arrow $a'$ and the connection between the ports $c$ and $b$ and also the ports $h$ and $g$ by the cavity $f$ of the valve O is made, thus permitting the air to escape from the brake-cylinder to the atmosphere, as shown in Fig. 3. The valves retain this position, as shown in Fig. 3, until the train-pipe pressure and auxiliary pressure are equalized through groove D', after which the piston E and the valve N are moved back in the inverse direction of the arrow a' by the springs K and L, the valve N moving along until the ports b and c are closed, the valve O remaining in the position shown in Figs. 1 and 3 as the outward travel of the slide-valve is not sufficient at this time to move valve O. Thus it will be seen that it is impossible for the brakes to set from a leak anywhere in the triple valve when the parts are in the position shown in Fig. 1, as the channels leading from the brake-cylinder to the atmosphere— i. e., the channel i, ports h and g, cavity f in the valve O, and the channel e—are always open.

Having thus fully described my invention, I claim as new and desire to secure by Letters Patent—

1. In an air-brake of the class described, the combination, with the cylinder and the slide-valve chamber, of a piston in said cylinder acted on by the train-pipe pressure and controlling the flow of air from the train-pipe to the auxiliary reservoir, the normal position of the piston being between the ends of the cylinder, a main slide-valve in said chamber controlled by the said piston and operating over ports adapted to connect or disconnect the auxiliary reservoir with or from the brake-cylinder and the latter with or from the atmosphere, and a double-acting spring mechanism acting on the slide-valve after movement in either direction and returning it to its normal position, substantially as shown and described.

2. In an air-brake of the class described, a spring-pressed piston acted on by the train-pipe pressure and controlling the flow of air from the train-pipe to the auxiliary reservoir, a main slide-valve controlled by the said piston and operating over ports adapted to connect or disconnect the auxiliary reservoir with or from the brake-cylinder and the latter with or from the atmosphere, and an auxiliary slide-valve controlled by said main slide-valve and controlling an additional release-port, substantially as shown and described.

3. In an air-brake of the class described, a piston acted on by the train-pipe pressure and controlling the flow of air from the train-pipe to the auxiliary reservoir, a double-acting graduating-spring and a double-acting emergency spring adapted to act on the said piston, and a main slide-valve controlled by the said piston and adapted to connect or disconnect the auxiliary reservoir with or from the brake-cylinder and the latter with or from the atmosphere and also controlling an emergency port to additionally connect the brake-cylinder with the auxiliary reservoir, substantially as shown and described.

4. In an air-brake of the class described, a piston acted on by the train-pipe pressure and controlling the flow of air from the train-pipe to the auxiliary reservoir, a double-acting graduating spring and a double-acting emergency spring adapted to act on the said piston, a main slide-valve controlled by the said piston and adapted to connect or disconnect the auxiliary reservoir with or from the brake-cylinder and the latter with or from the atmosphere and also controlling an emergency port to additionally connect the brake-cylinder with the auxiliary reservoir, and an auxiliary slide-valve controlled by the said main slide-valve and controlling an additional release-port connecting the brake-cylinder with the atmosphere, substantially as shown and described.

5. In an air-brake of the class described, the combination, with the drip-chamber having an inlet and outlet opening for the air and a screw-plug opposite the air-outlet and provided in its inner face with a socket, of a dust-strainer having a loose bearing at its inner end in said outlet-opening and a stem at its opposite end entering said plug-socket, and a spring holding the inner end of the strainer properly seated, substantially as shown and described.

6. In a triple valve, the combination, with the cylinder, the slide-valve chamber, the piston, and the slide-valve, of a chamber through which the air passes to the cylinder, a stem projecting from the piston into the said chamber and having heads at its ends provided with reduced inner ends, forming two shoulders, loose collars on said reduced portions, a large spiral spring between and pressing said collars apart, and two loose collars on the stem and a spiral spring surrounding the stem within the larger spring and pressing the latter collars against the smaller shoulders, whereby the piston is allowed a limited movement from its normal position in either direction against the action of the larger spring without bringing the smaller spring into action, substantially as shown and described.

7. In a triple valve, the combination, with the cylinder, the slide-valve chamber, the piston, and the slide-valve, of a chamber through which the air passes to the cylinder, a removable tubular plug on the outer end of said chamber, a stem entering said chamber from the piston and having heads at its ends provided with reduced inner ends, the outer head being removable from the stem and working in the tubular plug, loose collars on the reduced portions of the heads, a large spiral spring pressing said collars apart against the two outer shoulders, two loose collars on the stem, and a smaller spiral spring on the stem and pressing the latter collars apart against the two inner shoulders, substantially as shown and described.

8. In a triple valve, the combination, with the cylinder, the piston, and springs returning the piston to its normal position, of a valve-chamber through which air passes to the auxiliary reservoir from said cylinder, a valve-seat having two ports $b$ $c$ at its inner end, a port $j$ at its outer end, two intermediate ports $g$ $h$ between its ends, an exhaust-channel connecting ports $c$ $g$ $h$, a channel $d$, communicating with ports $b$ $g$ $j$ and leading to brake-cylinder, a slide-valve operated by the stem of said piston and having a longitudinal groove $a$ in the lower face of its inner end to connect ports $b$ $c$ and adapted at its opposite end to close port $j$, said slide-valve being provided with a transverse open chamber $N'$ between its ends to register with port $j$, and an auxiliary slide-valve O within and of less length than said chamber $N'$ and having a transverse groove $f$ in its lower face normally connecting ports $g$ $h$, substantially as shown and described.

ALFRED P. RIGGS.

Witnesses:
W. L. SWIFT,
J. M. SPAIN.